United States Patent [19]

Currey

[11] 4,306,516

[45] Dec. 22, 1981

[54] DEODORIZING LITTER FOR POULTRY FARMS

[75] Inventor: John E. Currey, San Antonio, Tex.

[73] Assignee: The Cosmin Corporation, San Antonio, Tex.

[21] Appl. No.: 148,202

[22] Filed: May 9, 1980

[51] Int. Cl.$^3$ .............................................. A01K 1/015
[52] U.S. Cl. .......................................... 119/1; 424/76
[58] Field of Search ............... 119/1; 424/76; 252/449

[56] References Cited

U.S. PATENT DOCUMENTS

| | | | |
|---|---|---|---|
| 2,708,418 | 5/1955 | Sugarman et al. | 119/1 |
| 3,645,893 | 2/1972 | Rohrer | 119/1 X |
| 3,776,188 | 12/1973 | Komakine | 119/1 |
| 3,898,324 | 8/1975 | Komakine | 424/76 |
| 3,921,581 | 11/1975 | Brewer | 119/1 |

*Primary Examiner*—Hugh R. Chamblee
*Attorney, Agent, or Firm*—Donald C. Studley

[57] ABSTRACT

A particulate deodorizing poultry litter is described. The litter is a mixture comprised of from about 80 to about 95 percent by weight ferrous sulfate heptahydrate; from about 0.1 to about 3.5 percent by weight iron oxide and may contain from about 0.2 to about 1.5 percent calcium carbonate. The particles have from about 0.1 to about 0.5 percent by weight free sulfuric acid distributed on their surfaces. The particles range in size from about 0.02 to about 0.2 inches in diameter. The ammonia produced by zymosis of bird drippings is effectively reduced and maintained at levels less than 50 parts per million and usually less than 30 parts per million.

10 Claims, No Drawings

DEODORIZING LITTER FOR POULTRY FARMS

BACKGROUND OF THE INVENTION

The present invention relates to an improved, deodorizing litter for poultry farms. Litter is a cover provided for the floor or earth area upon which fowl are raised and receives the droppings from the fowl. Litter plays a very important part in the modern poultry raising industry. Litter contributes to the production of healthier poultry, lower condemnation rates and higher weight gain, which are factors which have a positive effect on the economics of the grower. Poultry litter presently in general use is comprised of particulate cellulosic materials, such as wood shavings, wood chips, sugar cane bagasse or straw. Frequently, such litters are a source of bacteria, molds, toxic residues or harmful gases. While the present invention will be described in terms of chicken raising, it will be understood that it is equally applicable to other gallinaceous birds, for example, turkeys, ducks and pheasants.

Most everyone has at one time or another experienced an encounter with bird excrement, usually on a small scale. On a large scale, poultry droppings and the resulting ammonia are a problem to the present day poultry farmers who raise flocks numbering from thousands to hundreds of thousands of birds in a relatively confined enclosure. The excrement from such flocks soon covers the entire floor area of the enclosure. Although initially somewhat innocuous, being about 75 percent by weight water and having a neutral pH, the warm droppings rapidly undergo zymosis, emitting noxious gases, such as ammonia and hydrogen sulfide, and a rank odor. In the summer months, the gases and odor may be carried several miles, to the consternation and discomfort of neighbors of poultry farms. The problems of the grower are compounded in the cooler winter months as the confining area, typically a chicken or brooder house, is maintained as closed as possible to conserve heat and maintain a necessary warm environment for the fowl. However, the level of gases, such as ammonia, and the odor of decaying excrement makes substantial ventilation necessary with consequent loss of heat. Ammonia becomes highly noticeable to the poultry house worker when the concentration reaches 20 parts per million (ppm). The eyes and nasal passages of workers become irritated at ammonia concentrations above about 40 ppm. Broiler weight is affected when ammonia concentrations reach 50 ppm. Research has demonstrated that at 49 days of age, broilers exposed to such levels of ammonia average almost 0.4 pounds lighter than their counterparts grown in environments free, or substantially free, of ammonia. Under conditions of high (over 50 ppm) ammonia concentrations, the egg-laying rate of chickens has been found to be reduced by about 30 percent.

Various means have previously been proposed to alleviate or eliminate the odor and gaseous products of bird droppings. For example, U.S. Pat. Nos. 3,776,188 and 3,898,324 describe a litter containing ferrous sulfate heptahydrate mixed with fly ash or zeolite powder. While such litter is a great improvement over no litter at all, such litters are not satisfactory in commercial use because of their relatively short life. The floor life of such mixtures is usually about 10 days. This means that the used litter must be topped or that it must be taken up, a chore unto itself, and new litter spread over the floor area, several times during the raising of a flock from chicks to broilers.

The particulate litter product of the present invention is easier handling, more efficient and longer lasting than the prior art litter mixtures. The present litter product provides an improved environment for raising healthier and higher quality poultry. The present litter allows a reduction in ventilation in colder climates, saving energy and maintaining a warmer poultry house which keeps litter drier with less caking and less need for fresh litter.

BRIEF DESCRIPTION OF THE INVENTION

The present particulate, deodorizing poultry litter is comprised of a mixture containing from about 80 to about 95 percent by weight of ferrous sulfate heptahydrate; from about 0.1 to about 3.5 percent by weight of iron oxide; and, in a preferred composition, contains from about 0.2 to about 1.5 percent by weight of calcium carbonate.

The present litter particles have a limited amount of free sulfuric acid distributed on their surfaces. The amount of free sulfuric acid ranges from about 0.1 to about 0.5 percent by weight and, more preferably, from about 0.1 to about 0.3 percent by weight of the litter mixture. Generally, when more than about 0.5 percent by weight free sulfuric acid is present, the particles tend to agglomerate, causing the litter mixture to lose its desired free flowing characteristic required to properly and uniformly distribute the litter in a poultry house.

Ammonia will react with crystalline ferrous sulfate. However, the reaction soon converts the surface atoms of ferrous sulfate to a variety of compounds, such as ammonia sulfate, water, ferric and ferrous hydroxides and various compounds and chelates of iron and ammonia. Once the surface reactions have taken place, the particulate ferrous sulfate is no longer capable of rapid ammonia absorption, and its ability to reduce ammonia concentrations is substantially reduced. Such reduction is especially noticeable in poultry houses having low humidities. Thus, the prior art ferrous sulfate litter mixtures initially functioned well, but were exhausted after a relatively short period of time.

It will be understood that the following theoretical discussion should not be interpreted as limiting the present invention to to a particular theory or explanation. It is postulated that the free sulfuric acid on the surface of the present litter particles, being much more hydroscopic than ferrous sulfate, attracts and holds additional water molecules in liquid form. The liquid, acid-water mixture reacts aggressively with ammonia. The initial, reversible reaction between ammonia and water is a liquid-gas which produces ammonium hydroxide. The second, irreversible reaction is a neutralization reaction between ammonium hydroxide and sulfuric acid. The free sulfuric acid additive of the present invention provides both the water for the first reaction and the acid for the second reaction which efficiently and effectively reduces the amount of ammonia released into the air. It is further postulated that additional reactions, possibly chelating reactions, take place between the ammonium ions and the calcium, ferric, ferrous and sulfate ions dissolved in the water produced by the neutralization reaction. The present litter mixture remains generally dry to the touch and in a free-flowing form even after use.

The present litter mixture drastically reduces and maintains the ammonia concentrations the high levels of 300 to 375 ppm typically encountered in low ventilation poultry houses to levels of less than 50 ppm, and usually less than 30 ppm. Levels of less than 15 ppm are not uncommonly found in poultry houses using the litter of the present invention.

The particles in the present mixture range from about 0.02 to about 0.2 inches in diameter, averaging about 1/16" in diameter. The particulate form of the present litter facilitates both the initial spreading and the subsequent removal of the litter. In contrast, spreading of the prior art powder materials, especially in confined areas, created respiratory problems for both man and bird. The present litter in particulate form is surprisingly more efficient, even though the present particles have less surface area than the prior art powder mixtures.

DETAILED DESCRIPTION OF THE INVENTION

The present deodorizing litter is a particulate mixture of ferrous sulfate heptahydrate and iron oxide having from about 0.1 to about 0.5 percent by weight of the mixture of free sulfuric acid on the particle surface. In a preferred embodiment the mixture contains from about 0.2 to about 1.5 percent by weight calcium carbonate.

The ferrous sulfate component is suitably prepared by evaporating industrial solutions or sludges of ferrous sulfate, for example, those produced in the pickling of steel or those produced in the manufacture of titanium dioxide. Generally, the ferrous sulfate component is in the form of the heptahydrate. The ferrous sulfate component useful in the present mixtures needs not be of high purity, and the grade recovered from waste liquor is aptly suited to use.

The iron oxide component may suitably be a mixture of iron oxides and also may be recovered from industrial wastes.

Suitable ferrous sulfate heptahydrate may be recovered from waste liquors by evaporation and heating to a temperature between about 54° to about 60° C. An iron oxide product suitable for use in the present invention may be produced from the same waste source by heating at temperatures over 64° C.

The calcium carbonate component utilized in a preferred embodiment may be of industrial grade containing the impurities usually found in such grade, for example, minor amounts of magnesium carbonate and magnesium sulfate.

The free sulfuric acid component may be industrial grade acid and is suitably applied to the particulate mixture by merely adding the appropriate amount of acid and physically mixing the components.

The present litter material may also include a mold inhibitor, for example, calcium propionate; generally, amounts between about 0.05 and about 0.25 percent by weight have been found useful. In practice, using the present litter material, the addition of mold inhibitors is not usually required, unless the litter material is not to be changed for a long period, i.e., more than six months or longer.

The components may be dry mixed and subsequently pelletted by known techniques to obtain the present particulate litter form. However, more practically and economical, is to initially crush and grade the ferrous sulfate component to the desired size, add the iron oxide component and, if included, the calcium carbonate component, in finely divided form and dry mix. Although the sulfuric acid component may be added at an intermediate step, it is preferred to add the acid after the ferrous sulfate, iron oxide and calcium carbonate components have been mixed to insure that free acid is on the surface of the particles of the final product. The litter product is a brownish particulate material.

In use, the litter material is applied to the floor area of the fowl enclosure by hand spreading or by using a lawn-type spreader and subsequently working the litter to an even layer by raking. It is understood that, in applying the litter, suitable safety precautions, such as the use of goggles and dust masks, to prevent eye and nasal irritation from any dust generated in the spreading operation, should be taken. Generally, from about 0.15 to about 3.0 pounds of litter per square foot of floor space yields excellent long-term results.

In a typical application, a tightly ventilated chicken enclosure, having a floor area of 800 square feet, was treated with 240 pounds of the present preferred litter mixture. A flock numbering 1100 chicks was placed in the enclosure. The ammonia level was periodically tested over the period of chieck growth, from seven to eight weeks, and was found to range between about 10 and about 25 ppm ammonia. The original litter bed was allowed to remain throughout the raising period. The odor was found to be well within a tolerable level.

Comparative tests were made using a litter of wood shavings. The ammonia concentration rose steadily to a level of about 350 ppm and stayed at this level. The odor level, a rather subjective test due to the high level of ammonia, was substantially higher than the test carried out with the present litter.

The present litter may be continuously and effectively used for periods ranging from six months to as long as two years, depending upon the thickness of the litter layer. In some operations, the original layer is periodically topped, usually when a new flock is started, with a thinner layer of new litter and is completely changed only when the total depth of the litter becomes unwieldly.

The present litter may suitably be mixed with other litter materials, for example, wood chips or bagasse. However, reductions in ammonia and odor levels are adversely affected by dilutions which reduce the present litter aid below about 0.15 pounds per square foot of floor space. Although ammonia and odor levels are reduced even in such dilutions, such levels are not reduced to desirable levels.

The use or spent litter may be removed from the floor area of the enclosure and utilized, without further treatment, as fertilizer. In terms of bird droppings, an average flock of 100,000 birds will produce about 135 tons of droppings per year. The droppings contain about 4 percent by weight nitrogen, about 2½ percent by weight $P_2O_5$ and about 2 percent by weight $K_2O$. The amount from 100,000 birds is sufficient to fertilize from about 50 to about 100 acres of soil. Fertilizer from the present spent litter is particularly suited to use on iron deficient soils, such as the Calcareous or Caliche soils found in the Southern Great Plains. The used litter is also high in protein value, usually in the range of 22 to 26 percent, and is aptly suited to use as a feed, or as a feed supplement for cattle.

It will be appreciated that the present invention is not to be considered as limited to the specific examples and embodiments given in the foregoing and that various modificatioons may be made within the ordinary skill of the art without departing from the spirit and scope of the invention.

What is claimed is:

1. A solid particulate deodorizing litter mixture for application to the floor area of poultry enclosures comprising:
   (a) from about 80 to about 95 percent by weight ferrous sulfate heptahydrate,
   (b) from about 0.1 to about 3.5 percent by weight iron oxide, and
   (c) from about 0.1 to about 0.5 percent by weight free sulfuric acid distributed on the particle surfaces.

2. The litter of claim 1 wherein the composition includes from about 0.2 to about 1.5 percent by weight calcium carbonate.

3. The litter of claim 1 wherein the particulate mixture ranges in size from about 0.02 to about 0.2 inches in diameter.

4. The litter of claim 1 wherein the mixture contains a mold inhibitor.

5. The litter of claim 3 wherein the mold inhibitor is calcium propionate.

6. A method of deodorizing fowl enclosures which comprises spreading on the floor area of said enclosures from about 0.15 to about 3.0 pounds per square foot of a particulate litter comprising:
   (a) from about 80 to about 95 percent by weight ferrous sulfate heptahydrate,
   (b) from about 0.1 to about 3.5 percent by weight iron oxide, and
   (c) from about 0.1 to about 0.5 percent by weight free sulfuric acid distributed on the particle surfaces.

7. The method of claim 6 wherein the litter contains from about 0.2 to about 1.5 percent by weight calcium carbonate.

8. The method of claim 6 wherein the particulate mixture ranges in size from about 0.02 to about 0.2 inches in diameter.

9. The method of claim 6 wherein the mixture contains a mold inhibitor.

10. The method of claim 6 wherein the mold inhibitor is calcium propionate.

* * * * *